3,298,781
PRODUCTION OF SULFITES FROM RED MUD
Shinichi Fukuma, Tokyo, and Masumi Atsukawa, Yoshihiko Nishimoto, and Yoshiya Inoue, Hiroshima, Japan, assignors to Mitsubishi Shipbuilding & Engineering Company, Limited, Tokyo, Japan, a corporation of Japan
Filed Feb. 5, 1963, Ser. No. 256,346
Claims priority, application Japan, Feb. 9, 1962, 37/4,268
1 Claim. (Cl. 23—131)

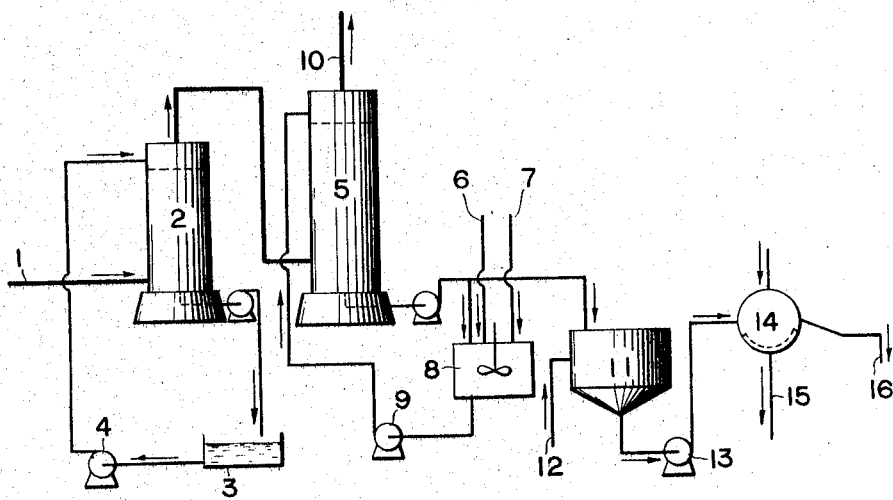

The invention relates to a process of treating waste gases containing gaseous sulfur dioxide, with red mud produced as a by-product in manufacturing alumina from bauxite and other similar crude ores by an alkali extraction process such as the Bayer process.

As is well known, waste gases exhausted from metal refining plants, chemical plants, steam power stations, etc. normally contain sulfur dioxide, which is typical of harmful materials causing injury to man, animals and crops, and also causing structures to be corroded. Nevertheless, sulfur dioxide is useful as a raw material in the chemical industry. It is very desirable to remove from the waste gases sulfur dioxide because, as explained above, it is a harmful material.

Therefore, it is the chief object of the invention to provide a novel process of treating waste gases containing gaseous sulfur dioxide, with red mud produced as a by-product in manufacturing alumina from bauxite and other similar crude ores by an alkali extraction process such as the Bayer process, soda-lime process or the like to thereby remove from the waste gases gaseous sulfur dioxide, which is harmful to the public, and simultaneously to recover sodium compounds from the red mud.

At present, the Bayer process is substantially exclusively used to manufacture alumina. The Bayer process comprises, as its first step, leaching or digesting bauxite and other similar crude ores with a solution of sodium hydroxide to extract an alumina component contained therein as a solution of sodium aluminate. At the same time, a third or a half the amount of the crude ore used is inevitably discharged as a residual red mud. Only one portion of the red mud thus discharged is commonly employed as a material for improving soil, and for pigments with the greater part thereof not being used because uses for the same have not yet been found.

The analysis of such a red mud may be, for example, 18.9% $Al_2O_3$, 8.3% $Na_2O$, 17.4% $SiO_2$, 39.3% $FeO_3$, 2.8% $TiO_2$ and 10.5% ignition losses. That is, the red mud contains relatively large amounts of alumina and sodium and accordingly it is a serious object in the alumina industry to find practical applications of the same.

The present invention, which meets the foregoing needs, is a novel process of treating gaseous sulfur dioxide by skillfully utilizing the above referred to commercial wastes for the dual purpose of preventing public injury from gaseous sulfur dioxide and of recovering valuable substances from the wastes.

According to the invention there is provided a process of treating a waste gas containing gaseous sulfur dioxide, with the above referred to red mud comprising the steps of adding water to the red mud to prepare a slurry including the red mud in a concentration of at most 40% by weight, contacting the waste gas containing gaseous sulfur dioxide with said slurry at a temperature within a range of from about room temperature to 100° C. and preferably about room temperature to cause the gaseous sulfur dioxide to be absorbed by the $Na_2O$ contained in the red mud, and separating an aqueous solution of sodium bisulfite formed by said absorption, from an insoluble residue for removal.

Preferably, the slurry including the red mud may have a pH value of from 3.5 to 6. The best results are given when the slurry has a pH value of the order of 4.3.

If it is desired to recover valuable substances from the red mud and if a waste gas to be treated contains gaseous sulfur dioxide of concentration insufficiently low to reduce the pH value of the slurry to the order of 4.3 after the same has absorbed sulfur dioxide then an amount of relatively concentrated sulfur dioxide may be additionally absorbed by the slurry until the same will have its pH value ranging from 4 to 5.

The invention will become more readily apparent from the following detailed description taken in conjunction with the accompanying drawing including a single figure in which an apparatus suitable for use in practicing the process of the invention outlined above is illustrated diagrammatically.

Briefly, the process of the invention comprises the absorption step of passing a waste gas containing gaseous sulfur dioxide through any suitable absorber device where gaseous sulfur dioxide is absorbed by a slurry including the red mud suspended in water, which slurry is a liquid absorbent, and the step of separating the resulting aqueous solution of sodium bisulfite from the slurry supplied by the absorber device and having absorbed sulfur dioxide provided that that slurry has a pH of proper value for the purpose of removing sulfur dioxide from the waste gas. Alternatively, if the slurry having absorbed sulfur dioxide will be to high in pH value an amount of relatively concentrated sulfur dioxide may be additionally absorbed by the slurry until its pH reaches the proper value. Then the resulting aqueous solution mainly containing sodium bisulfite will be separated from the so treated slurry.

In the absorption step, gaseous sulfur dioxide contained in the waste gas to be treated is absorbed by the slurry of red mud and reacted with a sodium compound or compounds in the slurry. It has been found that the conditions of the slurry such as the concentration of the red mud and the temperature of the slurry affect greatly its ability to absorb sulfur dioxide, particularly when the concentration of sulfur dioxide contained in the waste gas is low. According to the invention, the concentration of the red mud contained in the slurry should be substantially at most 40% by weight in order to maintain the fluidity of the slurry necessary for use as a liquid absorbent. Experiments indicated that the concentration of the red mud within the range above specified scarcely affects the ability of the slurry to absorb sulfur dioxide. In addition, the temperature of the slurry should range from room temperature to 100° C. It has been found, however, that the lower temperature of the slurry gives the better results.

Therefore, if a waste gas to be treated is at an elevated temperature then it is necessary to provide a gas cooling stage before an absorber device where sulfur dioxide is adsorbed. Alternatively, a two stage absorber device may be used with the first stage functioning to cool the waste gas and also to absorb sulfur dioxide while the second stage functions to effect absorption of sulfur dioxide alone.

An example of the absorption step will now be described. In this example, there is used a gas absorber in which the waste gas is bubbled into the liquid absorbent (red mud surry) is used to scrub a waste gas with the slurry as above described. The waste gas used comprised a composition consisting of 0.02% by weight of sulfur dioxide, 3% by weight of oxygen, 8.5% by weight of water vapor, 12.5% by weight of carbon dioxide and the balance being nitrogen. The following table shows a variation in absorption factor of sulfur dioxide dependent upon the concentration and temperature of the slurry.

As shown in the table the absorption factor of sulfur dioxide is increased as the temperature of the slurry is decreased.

TABLE

| Concentration of slurry in percent by weight | 30 | | | | 20 | 10 |
|---|---|---|---|---|---|---|
| Temperature of slurry in °C | 40 | 50 | 70 | 95 | 40 | 40 |
| Absorption factor of sulfur dioxide in percent | 79.5 | 72 | 62 | 4.5 | 75 | 78 |

The separation step of the invention is to separate from the liquid absorbent a solid component containing alumina, iron oxide, silica, etc. to obtain an aqueous solution of sodium bisulfite. If it is, for example, desired to recover alumina from the so separated solid residue according to any of the known techniques, then a sodium compound such as sodium bisulfite is required to be substantially fully separated from the liquid absorbent in order to improve separation of alumina and silica.

It has been found that this requirement is met by properly adjusting the pH value of the slurry of red mud used. If the pH value of the slurry is too high, a reaction by which a sodium compound or compounds contained in the red mud is dissolved out as soluble sodium bisulfite, soluble sodium sulfite or the like will not sufficiently proceed resulting in decrease in yield of the sodium compounds. On the contrary, if the pH value of the slurry is too low there is a likelihood of dissolving out alumina, iron oxide, silica, etc. contained in the red mud together with the sodium compound or compounds whereby the purity of sodium bisulfite produced is reduced. Consequently it has been discovered that the pH value of the treated slurry used should be in a range of from 4 to 5 and preferably on the order of 4.3.

Accordingly, if it is desired to post-treat the solid residue such as for the recovery of alumina from the same and if a gas to be treated in the absorption step contains sulfur dioxide in a concentration too low to reduce the pH value of the liquid absorbent to the order of 4.3 then an amount of relatively concentrated sulfur dioxide is required to be additionally absorbed by the liquid absorbent until the pH of the same reaches the specified value.

Thus it will be appreciated that the absorption step is necessarily adjusted in operating conditions to prevent the liquid absorbent after having absorbed sulfur dioxide from having a pH value below 4.3.

An experimental run of the absorption step was conducted to result in a pH value of the slurry of 4.3 and the resultant solution separated from the slurry (liquid absorbent) comprised 1.8% $Al_2O_3$, 7.8% $SiO_2$ and 90.4% $Na_2O$. Based on the composition of the original red mud (see above) these figures were found to correspond to yields in percent of 88.6, 3.6 and 0.8 respectively of $Na_2O$, $SiO_2$ and $Al_2O_3$. This means that the sodium compounds could be separated and recovered with a high yield.

The aqueous solution of sodium bisulfite thus produced may be utilized for various purposes. For example, to this aqueous solution may be added soda ash to neutralize the solution and thereby deposit sodium sulfite. Also soda ash may be added to the solution under pressure to deposit sodium bisulfite. Alternatively, zinc oxide may be added to the solution to deposit zinc sulfite which, in turn, is separated from an aqueous solution of sodium hydroxide thereby produced. The solution of sodium hydroxide will be used to leach or digest alumina crude ores while zinc sulfite will be calcined to reproduce zinc oxide and to produce sulfur dioxide of a high concentration serviing as a raw material for producing sulfuric acid.

Referring now to the drawing, there is illustrated an apparatus suitable for carrying out the invention. A gas to be treated such as a waste gas is introduced through a feed pipe 1 into a gas cooling tower 2 through which a coolant, for example, water from a reservoir 3 is circulated by a circulating pump 4. Thus the gas introduced into the cooling tower 2 can be cooled to a low temperature suitable for the subsequent absorption step while a substantial part of dusts carried by the flow of gas is removed from the same and deposited in a deposit pool or the reservoir 3. The flow of gas properly cooled passes to an absorbing tower 5 through its lower portion. Circulated through the absorbing tower 5 is a liquid absorbent comprising the red mud slurry of the specified concentration in water. To this end, water from its source schematically designated by the reference numeral 6 and the red mud from its ource schematically designated by the reference numeral 7 are fed, in a proper proportion into a mixture tank 8 to form an aqueous suspension, i.e., the liquid absorbent, which, in turn, is supplied to the upper portion of the absorbing tower 5 by the action of a feed pump 9.

While the gas to be treated flows upwardly through the absorbing tower 5 the same is scrubbed with the aqueous suspension of red mud flowing downwardly through the tower whereby sulfur dioxide contained in the gas is absorbed by the suspension until the remaining portion of the gas which is a harmless gas is discharged from the tower through its top to the discharge conduit 10. As shown in the drawing, a substantial portion of the suspension including absorbed sulfur dioxide is returned back to the mixer tank 8 for the purpose of recirculating the same through the absorbing tower 5 whereas the remaining suspension is introduced in an absorber tank 11 for absorbing concentrated sulfur dioxide.

That portion of the liquid absorbent introduced into the tank 11 absorbs concentrated sulfur dioxide supplied by an external source through a conduit 12 and its pH is controlled to the optimum value, for example, on the order of 4.3. As previously described, such liquid absorbent is converted into an aqueous solution of sodium bisulfite and a solid component comprising alumina, iron oxide, titanium oxide, silica, etc. A pump 13 serves to feed the absorbent into a filter device 14 where the aqueous solution of sodium bisulfite is discharged into a discharge pipe 15 and the solid component is discharged into another discharge pipe 16 resulting in the completion of separation.

From the foregoing, it will be appreciated that, by the provision of a process comprising the steps of contacting a waste gas containing sulfur dioxide with a slurry including the aforesaid red mud in a concentration not exceeding 40% by weight, at a temperature within a range of from room temperature to 100° C. to thereby cause sodium compounds contained in the red mud to absorb the sulfur dioxide, and separating the sulfur dioxide from the slurry as an aqueous solution of sodium bisulfite, the invention enables the utilization of a commercial waste gas so as to effectively remove from the waste gas sulfur dioxide which is harmful to the public but commercially useful and also the economical extraction from a commercial waste solid of valuable components contained therein. The invention also has provided a range of pH values of the slurry in order to effect such extraction of the useful and valuable components from the wastes. It is to be understood that, instead of a waste gas, a gas of sulfur dioxide may be advantageously employed for extraction of the valuable components from the waste solid.

What we claim is:

A process for reacting a gas containing sulfur dioxide with a red mud produced as a by-product of an alkali extraction of bauxite, said red mud comprising alumina, silica and sodium oxide comprising: adding water to said red mud to form a slurry thereof containing at most 40% by weight of said red mud; contacting said gas with said slurry at a temperature between room temperature and about 70° C., whereby said slurry absorbs the sulfur dioxide, until the pH of the slurry is from 4 to 5; separating from a resulting insoluble residue of said red mud an aqueous solution mainly of sodium bisulfite resulting from the absorption of sulfur dioxide and treating said solution to recover therefrom a compound selected from the group consisting of bisulfites and sulfites.

References Cited by the Examiner

UNITED STATES PATENTS

| | | | |
|---|---|---|---|
| 2,161,056 | 6/1939 | Johnstone et al. | 23—178 |
| 2,750,290 | 6/1956 | Schoeffel | 23—131 X |
| 3,085,858 | 4/1963 | Trubey et al. | 23—130 X |

FOREIGN PATENTS

| | | |
|---|---|---|
| 396,969 | 8/1933 | Great Britain. |
| 721,506 | 1/1955 | Great Britain. |

OSCAR R. VERITZ, *Primary Examiner.*

BENJAMIN HENKIN, *Examiner.*

B. LEVENSON, *Assistant Examiner.*